(12) United States Patent
Kato (10) Patent No.: US 7,540,391 B2
(45) Date of Patent: Jun. 2, 2009

(54) DOOR SHUTTER

(75) Inventor: Masakatsu Kato, Dublin, OH (US)

(73) Assignee: Nifco Inc., Yokohama-shi (JP)

( * ) Notice: Subject to any disclaimer, the term of this patent is extended or adjusted under 35 U.S.C. 154(b) by 479 days.

(21) Appl. No.: 11/214,020

(22) Filed: Aug. 30, 2005

(65) Prior Publication Data

US 2007/0045366 A1 Mar. 1, 2007

(51) Int. Cl.
B65D 43/14 (2006.01)
(52) U.S. Cl. .................. 220/252; 220/345.1; 220/345.2; 296/37.1
(58) Field of Classification Search .................. 224/312; 220/211, 252, 345.2, 345.4, 345.1, 348; 296/37.1
See application file for complete search history.

(56) References Cited

U.S. PATENT DOCUMENTS

| | | | | | |
|---|---|---|---|---|---|
| 1,003,610 | A | * | 9/1911 | Kamenstein | 220/252 |
| 2,555,705 | A | * | 6/1951 | Schafer | 220/348 |
| 3,460,878 | A | * | 8/1969 | Appel et al. | 312/297 |
| 3,837,464 | A | * | 9/1974 | Baughman et al. | 400/685 |
| 4,162,024 | A | * | 7/1979 | Shanley | 220/350 |
| 4,854,632 | A | * | 8/1989 | Kreuze et al. | 296/37.12 |
| D343,641 | S | * | 1/1994 | Hafendehl et al. | D19/75 |
| 5,713,621 | A | * | 2/1998 | Krenkel et al. | 296/186.4 |
| 5,761,750 | A | * | 6/1998 | Mazzola et al. | 4/500 |
| 6,116,674 | A | * | 9/2000 | Allison et al. | 296/37.8 |
| 6,123,134 | A | * | 9/2000 | Thomas et al. | 160/8 |
| 6,478,204 | B2 | * | 11/2002 | Lange et al. | 224/539 |
| 6,499,785 | B2 | * | 12/2002 | Eguchi | 296/37.8 |
| 6,618,981 | B1 | * | 9/2003 | Rodriguez | 43/54.1 |
| 6,883,852 | B2 | * | 4/2005 | Laskey | 296/37.8 |
| 7,082,196 | B2 | * | 7/2006 | Kauhaniemi et al. | 379/447 |
| 2002/0005424 | A1 | * | 1/2002 | Lange et al. | 224/539 |
| 2002/0070220 | A1 | * | 6/2002 | Kuehn et al. | 220/350 |
| 2003/0052129 | A1 | * | 3/2003 | Fukuo | 220/350 |
| 2004/0118851 | A1 | * | 6/2004 | Shinomiya | 220/345.1 |

FOREIGN PATENT DOCUMENTS

| JP | 54-33442 | 3/1979 |
|---|---|---|
| JP | 8-192685 | 7/1996 |

* cited by examiner

Primary Examiner—Anthony D Stashick
Assistant Examiner—Christopher B McKinley
(74) Attorney, Agent, or Firm—Manabu Kanesaka (57) ABSTRACT

A door shutter is disposed in a device having an opening, and side portions for defining the opening. The other side of the opening extends higher than the one side. Guide grooves are formed along the side portions. The shutter includes main bodies bendable in a sliding direction for opening and closing the opening on the device, and projecting portions projecting from lateral sides of the main bodies in a width direction thereof and slidably engaging the guide grooves. The main body has first and second sides corresponding to the one and the other sides of the device. The wall thickness at the second side is thicker than that at the first side corresponding to the other side to form a substantially uniform surface from the one to the other sides through the main bodies.

10 Claims, 12 Drawing Sheets

DOOR SHUTTER

BACKGROUND OF THE INVENTION AND RELATED ART STATEMENT

The present invention relates to a door shutter sliding along a guide groove of a device and bendable in a sliding direction.

As shown in Patent Documents 1 and 2, the door shutter includes a main body bendable in the sliding direction and closing an opening of the device; and a projecting portion provided on both sides of a width direction of the main body and fitted into the guide groove of the device.

Figure 13A:
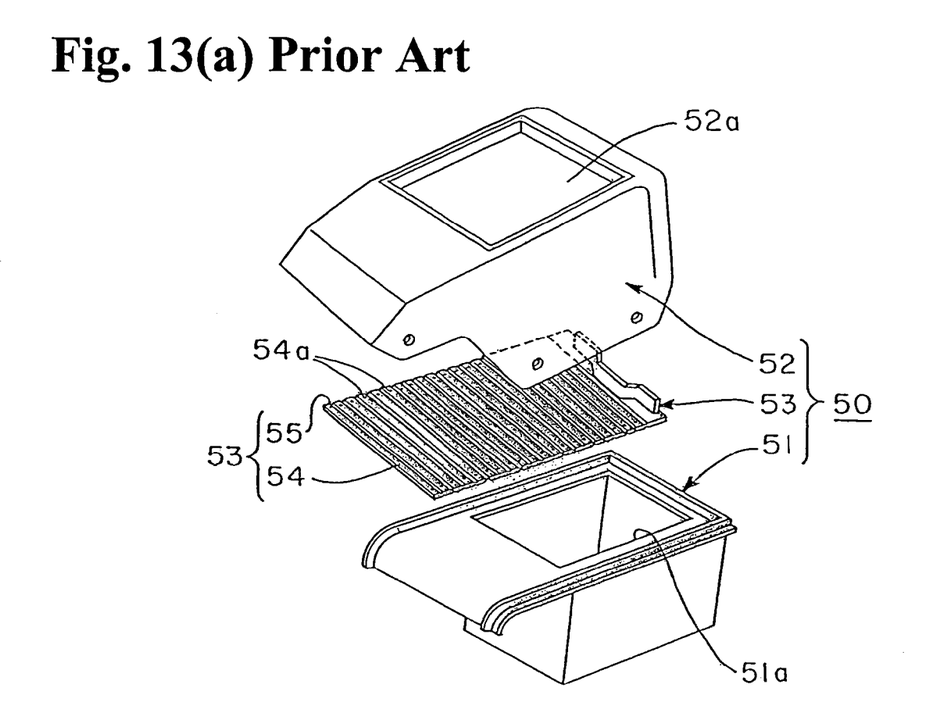
FIGS. 13(a) and 13(b) are explanatory drawings showing the shutter structures of Patent Documents 1 and 2.

As shown in FIG. 13(a), the structure of Patent Document 1 opens and closes an upper opening of a device 50 by a shutter 53. The device 50 consists of a main body 51 forming a housing portion 51a whose upper side is open; and a cover 52 with an opening 52a covering the main body 51 from above. The shutter 53 includes a main body 54 bendable through thin-walled portions 54a; and a number of projecting portions 55 projecting to both sides of the main body 54. In a state where each projecting portion 55 is fitted into both sides of the guide groove provided between the main body 51 and the cover 52, the shutter 53 slides to the lower left in the figure and turns to an open position from a closing position where the upper opening of the housing portion 51a is closed.

Figure 13B:
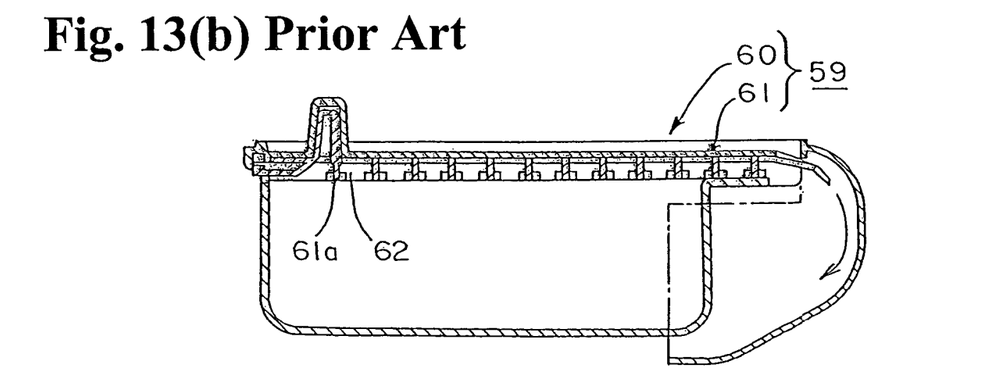

On the other hand, as shown in FIG. 13(b), the structure of Patent Document 2 opens and closes the upper opening of a device 59 by a shutter 61. The device 59 forms a guide groove 62 in both inner side wall portions wherein a container main body 60 forms the upper opening. The shutter 61 consists of a core material with strengthening ribs in a width direction and a surface material covering an upper surface. The shutter 61 includes a number of projecting portions and warp protection pieces 61a on both sides. In a state where the projecting portions and warp protection pieces 61a are fitted into the guide groove 62, the shutter 61 slides to the lower right in the figure and turns to the open position from the closing position wherein the upper opening of the container main body 60 is blocked.

Patent Reference 1: Japanese Patent Publication (Tokkai) No. S54-33442.

Patent Reference 2: Japanese Patent Publication (Tokkai) No. H8-192685.

In the structure of Patent Documents 1 and 2, upper edges of the both inner side wall portions of the opening of the device have the same height. However, with respect to a device installation portion, the upper edges of both inner side wall portions of the opening of the device may have the different heights, or the upper edges of the both inner side wall portions of the opening of the installation portion attaching the device may have different heights. Moreover, the guide groove may include a curve portion in a ditch direction.

In this case, in the structure of a conventional shutter, both guide grooves have different heights, or a line connecting both guide grooves slightly tilts toward a horizontal line, so that it is difficult to settle a sliding track of the shutter within the size between the both guide grooves. Also, in the structure of the Patent Documents 1 and 2, the shutter is made of resin which excels in formability and lightness in weight. Also, the main body is bent in the sliding direction depending on the way of formation of a thin-walled portion in a width direction or installation of the strengthening ribs. However, it is difficult to be satisfactorily bendable with weak force or reaction force while maintaining overall rigidity.

In addition, as shown in Japanese Patent Publication No. 2003-90186 which the applicants of the present invention developed, the conventional shutter is sometimes formed by a flexible resin surface material and rigid resin core material together by two-material molding. However, the conventional shutter includes the above-mentioned problems as well.

The present invention has been made in order to solve the above-mentioned problems, and an object of the present invention is to provide a door shutter which can satisfactorily maintain or improve the sliding characteristic and the exterior, while maintaining the overall rigidity, especially, no matter if the upper edges of the both inner side wall portions of the opening of the device have different heights, or the upper edges of both inner side wall portions of the opening of the installation portion attaching the device have different heights, or in spite of the curvature of the curve portion on a guide groove side.

Further objects and advantages of the invention will be apparent from the following description of the invention.

SUMMARY OF INVENTION

In order to achieve the above-mentioned purposes, a door shutter includes a main body bendable in a sliding direction and opening and closing an opening of the device, and projecting portions projecting to both sides of the width direction of the main body. In the door shutter, the projecting portions are fitted into guide grooves with curve portions provided on both side wall portions forming the opening of the device to be freely slidable.

In substantial parts of the present invention according to a first aspect, when one side of the upper edges of both side wall portions is higher than the other side, the main body has a wall thickness of the width direction, wherein one end side is formed thicker than the other end side corresponding to the upper edges of the side wall portions. Also, in a state where the projecting portions are fitted into the guide grooves, the outer surface of the main body which is the design side is arranged as a substantially uniform surface with the upper edges of the side wall portions.

Also, in the substantial parts of the present invention according to a second aspect, when one side of upper edges of inner side wall portions of the opening of ah installation portion for attaching the device is higher than the other side, the main body has the wall thickness in the width direction, wherein one end side is formed thicker than the other end side corresponding to the upper edges of the inner side wall portions. Also, in the state where the projecting portions are fitted into the guide grooves, the outer surface of the main body which is the design side is disposed substantially parallel to a line connecting the upper edges of the inner side wall portions of the opening of the installation portion.

On the other hand, in the substantial parts of the present invention according to a third aspect, the main bodies include elongated rigid pieces arranged along a sliding direction of the shutter with a predetermined space between two rigid pieces and having connecting projections at lateral sides thereof, and rectangular elastic connecting members disposed on a back side of each rigid piece to enable positioning. The projecting portions are formed as elastic frame portions projecting laterally from the connecting members corresponding to the rigid pieces and received therein.

In the above-mentioned invention, according to any one of the first to third aspect, the following structure is preferred. The opening of the device has a concave for forming a recess or retentive portion. Each guide groove forms the curve portion in the shape of C or inverted L along a ditch direction. A line connecting the guide grooves oh both sides is substantially horizontal with respect to the bottom face of the concave (fourth aspect).

Also, in the third aspect, the following structures are preferred. The connecting members have two members disposed on right and left of the back side of the rigid pieces (fifth aspect). The connecting members include piece portions corresponding to a number of the rigid pieces, the frame portions respectively provided in each piece portion, and a thin-walled portion for connecting the piece portions (sixth aspect). Moreover, in the structure, the piece portion forms a hole in order to insert a pin projecting on the back face of each rigid piece. Also, the thin-walled portion is formed between the piece portions and provided in more than two places (seventh aspect).

In the first aspect of the invention, one side of the upper edges of the inner side wall portions of the opening of the device is higher than the other side, and the main body has the wall thickness, wherein one side of the main body is formed thicker than the other side corresponding to the upper edges of the inner side wall portions of the opening of the device. As a result, the line connecting the guide grooves on both sides can be kept substantially in a horizontal position. Consequently, even if each guide groove includes the curve portion, a sliding characteristic can be maintained. At the same time, in the state where the main body of the shutter is fitted into the projecting portions corresponding to the guide grooves on both sides, the outer surface of the main body which is the design side is disposed at the substantially uniform surface with each upper edge of the inner side wall portions of the opening of the device. As a result, the external appearance of the invention in the closing position can be maintained excellent.

In the invention according to the second aspect wherein the one side of the upper edges of both inner side wall portions of the opening of the installation portion for attaching the device is higher than the other side, the main body of the shutter has the wall thickness in the width direction, one end side being formed thicker than the other end side corresponding to the upper edges of the inner side wall portions of the opening of the installation portion. As a result, the line connecting the guide grooves on both sides can be kept substantially in a horizontal position. Consequently, even if the guide grooves include the curve portions, the sliding characteristic can be maintained. At the same time, in the state wherein the main body of the shutter is fitted into the projecting portions corresponding to the guide grooves on both sides, the outer surface of the main body which is the design side is disposed substantially parallel to the line connecting the upper edges of the inner side wall portions of the opening of the installation portion. As a result, the external appearance of the invention in the closing position can be maintained excellent.

The invention according to the third aspect is constituted by a number of rigid pieces and the belt-like elastic connecting members connecting the rigid pieces, so that the invention is bendable with weak stress or reaction force while maintaining the overall rigidity. Consequently, even if the curvature of the curved portion on the guide groove side is reduced, it is hard to generate excessive local resistance or make an abnormal noise during sliding, so that an excellent sliding characteristic can be maintained. At the same time, the connecting member is, positioned on the back side of each rigid piece, and the convexes on the rigid pieces are respectively inserted and engaged with the elastic frame portions on the lateral surface. As a result, a number of rigid pieces can be united while maintaining bending ability and external appearance. Also, since the convexes are fitted into the guide grooves through the elastic frame portions, the sliding characteristic can be improved.

In the invention according to the fourth aspect, as a constitutional example of the first to third aspects, the following points are clarified. The opening of the device is the concave. Each curved portion of the guide groove has the shape of substantially C or inverted L, so that the curvature is reduced. Also, the line connecting the guide grooves on both sides is substantially horizontal with respect to the bottom face of the concave.

In the invention according to the fifth aspect, the connecting member of the third aspect can be constituted by one member or two members. However, it is clarified that the structure with the two members is preferred because of formability and the bending ability.

In the invention according to the sixth aspect, as the connecting member of the third aspect, for example, the piece portions and frame portions are used with respect to each rigid piece, so that the connecting member can be easily attached and connected. Also, an excellent bending characteristic by the thin-walled portion can be created.

In the invention according to the seventh aspect, as the connecting member of the sixth aspect, when the connecting member includes the hole wherein the pin provided in each rigid piece is engaged, the connecting member can be easily positioned and attached firmly. Also, when the frame portions are connected through divided thin-walled portions, the magnitude of hinge reaction force can be optionally selected.

DETAILED DESCRIPTION OF PREFERRED EMBODIMENTS

Figure 4:
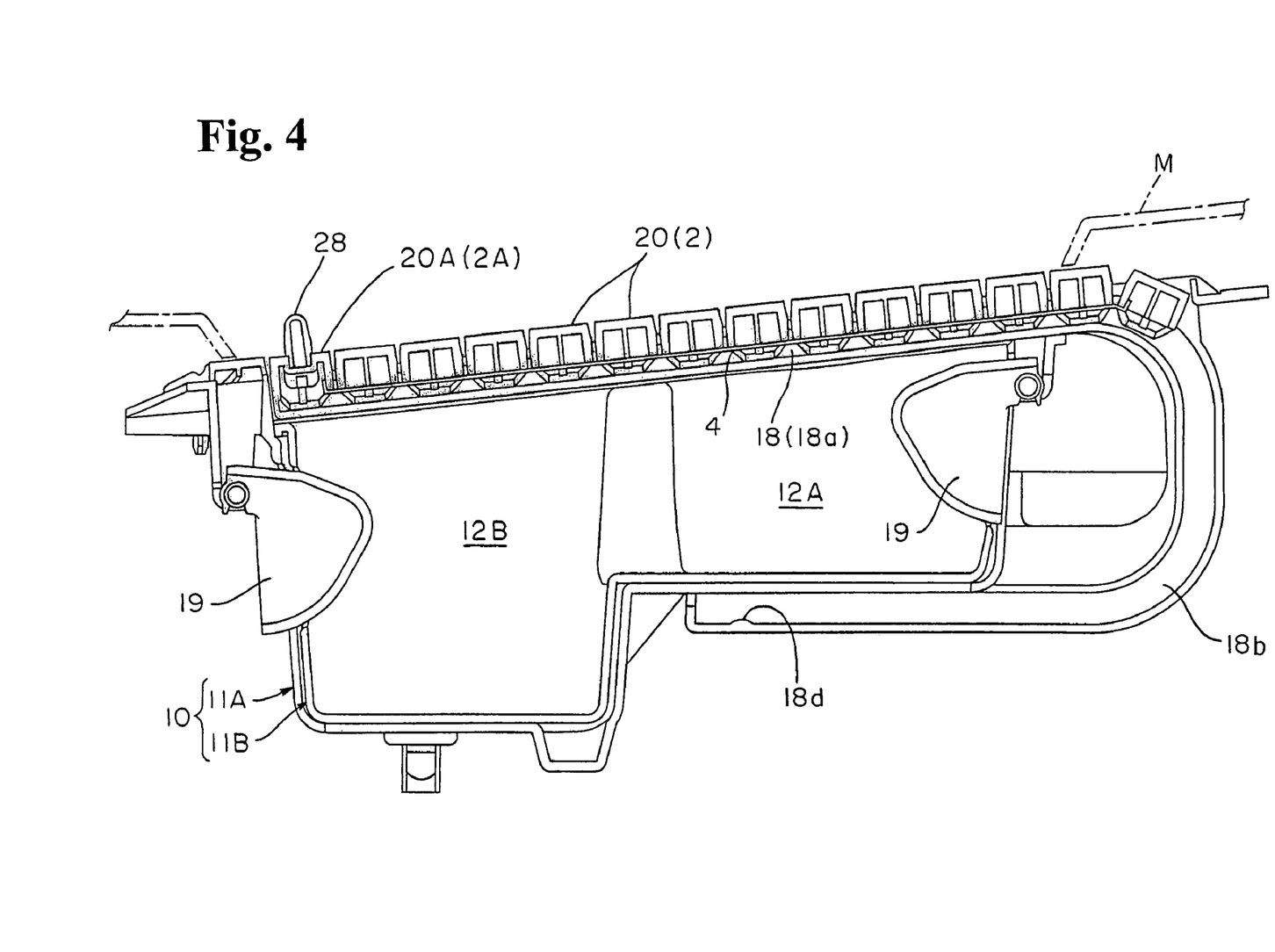
FIG. 4 is a sectional view taken along line 4-4 in FIG. 1 which shows a closing position of the shutter.
Figure 5:
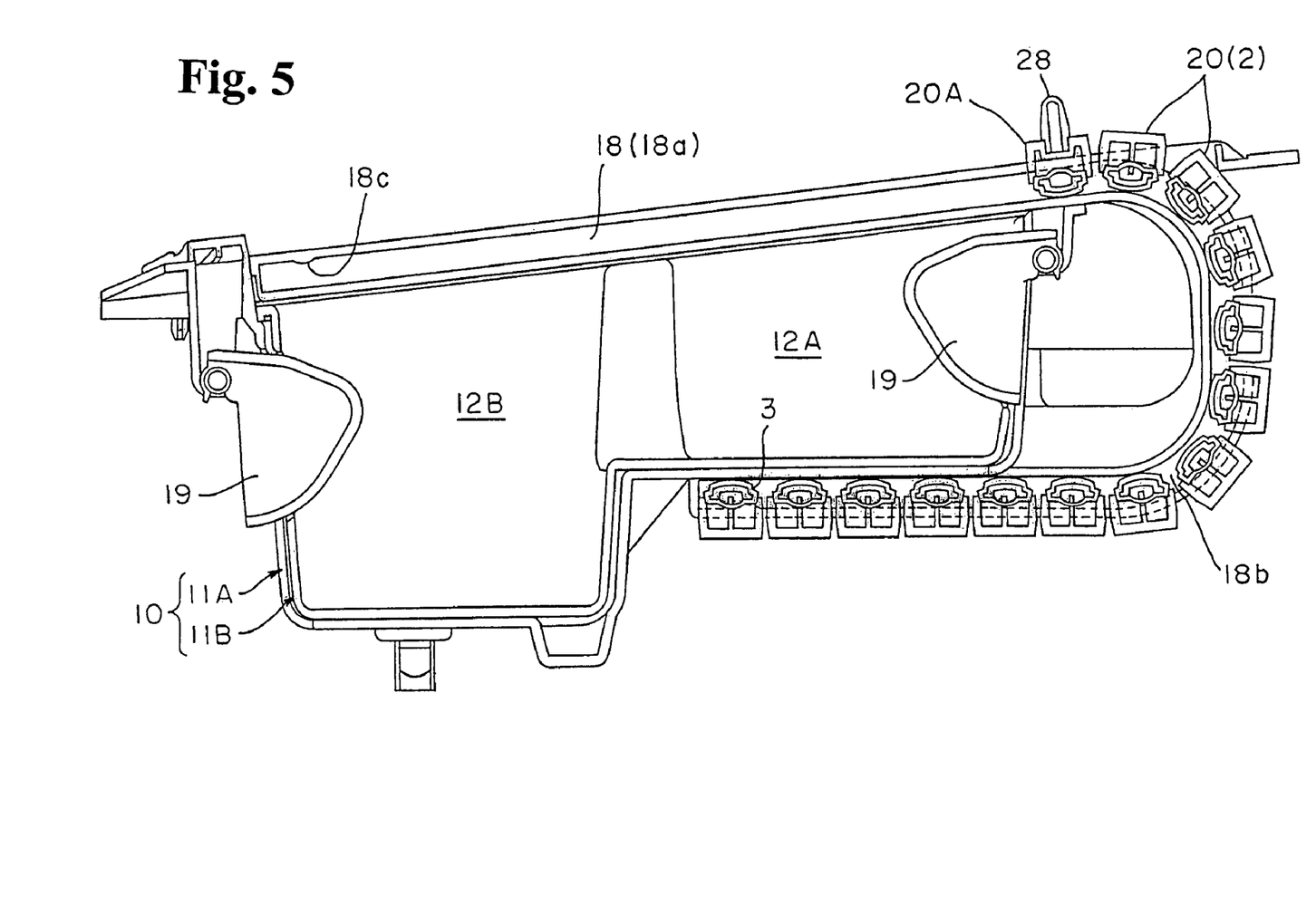
FIG. 5 is a cross sectional view after the shutter in FIG. 4 is slid to an open position.
Figure 6:
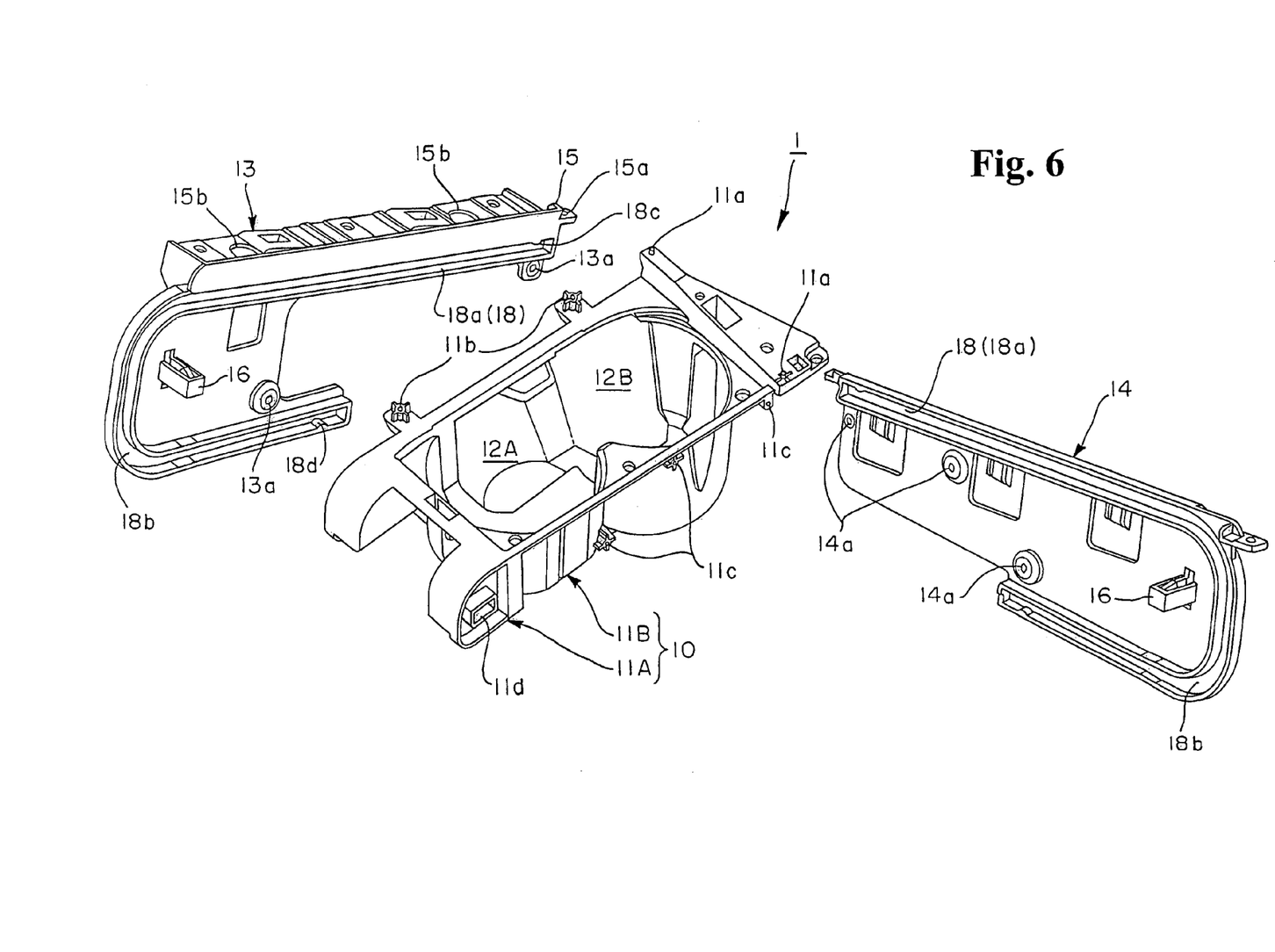
FIG. 6 is a schematic structural view showing the device in an exploded state.

Hereinafter, embodiments of the present invention will be explained with reference to the drawings. FIGS. 1-5 show an example wherein a shutter of the present invention is applied. FIG. 6 shows a schematic structure of the device only FIGS. 7-12 show a structure of the shutter only. In addition, FIGS. 4, 5 show a sectional embodiment taken along line 4-4 in FIG. 1, and hatching is omitted in order to avoid complication in the drawings. Also, FIG. 4 includes a cover member 4 of a shutter 2. FIG. 5 shows the embodiment wherein the cover member is omitted. Hereinafter, an outline, a device structure, a shutter structure, assembling, and operation are described in order.

(Outline) As shown in FIGS. 1-5, the shutter 2 as a subject includes a main body (a member for closing an opening 12 and composed of a number of rigid pieces 20 in the embodiment) bendable in a sliding direction and opening and closing the opening 12 of a device 1, and projecting portions (in the embodiment, composed of frame portions 31 on the connecting-member sides and convexes 21 or 22 on the rigid-piece sides which are inserted into and engaged with the frame portions 31). The projecting portions are slidably fitted into the respective guide grooves 18 including curve portions 18*b* provided inside side wall members 13(15), 14 forming the opening of the device.

As a first point of the device 1, when one side of the upper edges of the side wall members 13, 14 forming the opening 12 is formed higher than the other side, or when one side of upper edges M1, M2 of both inner side wall portions of the opening of an installation portion attaching the device 1 is formed higher than the other side, the main body of the shutter has the wall thickness in the width direction, wherein one-end side 20*a* is formed thicker than the other-end side 20*b* corresponding to the upper edges of the side wall members 13, 14, or the one-end side 20*a* is formed thicker than the other-end side 20*b* corresponding to the upper edges M1, M2. At the same time, in the state where the projecting portions are fitted into the guide grooves 18, the outer surface of the main body which is the design side is disposed as a substantially uniform surface with the upper edges of both side wall members 13, 14. Alternatively, the outer surface of the main body which is the design side is disposed substantially parallel to lines connecting the upper edges M1, M2 of both inner side wall portions of the opening of the installation portion.

As a second point, the main body includes substantially belt-like elastic connecting members 3 which are disposed along the sliding direction while keeping enough distances d, constituted by a number of rigid pieces 20, 20A forming connecting convexes 21, 22 at both ends. The connecting members 3 are disposed on the back side of each rigid piece 20, 20A to enable positioning. A number of projecting portions project to the lateral surface of the connecting members 3 corresponding to the convexes 21, 22 on the rigid material side, and the convexes are respectively inserted into and engaged with the frame portions 31.

(Device structure) As shown in FIGS. 3-6, the device 1 of the embodiment is a cup holder also used for storing small articles and laid under a center console M side of an automobile. The outside of a housing 10 is partitioned and formed by a resin outer frame member 11A; a resin inner frame member 11B; and side wall members 13, 14 attached to both sides. The outer frame member 11A has a shape wherein the inner frame member 11B can be installed inside. On both sides of the outer frame member 11A, there are provided positioning pins 11*a* with respect to the upper surface of both sides (actually, the front side pin in FIG. 6 is provided lower than the other side pin), attaching portions 11*b* with respect to one upper surface, attaching portions 11*c* with respect to both side surfaces, and engagement portions 11*d* as the installation portion, for installing both side wall members 13, 14. The inner frame member 11B is integrally connected inside the outer frame member 11A, and forms openings 12A, 12B (12) which are concaves and retain containers. In addition, inside the openings 12A, 12B, there are sub-holders 19 pivotally supported by a concave side wall and urged to rotate to the inside with urging springs not shown in the drawings. Also, even if a container has a different external diameter, the insides of the openings 12A, 12B can stably retain the container through the sub-holders 19.

The side wall members 13, 14 include holes 15*a* corresponding to the pins 11*a*; holes 13*a* and 14*a* overlapped with the attaching portions 11*c*; engagement foot portions 16; and guide grooves 18 provided on the inner side surface and settling the sliding track of the shutter 2. The side wall members 13, 14 are attached to the housing in the same way by engagements of the holes 15*a* and the pins 11*a*, engagements of the foot portions 16 and the engagement portions 11*d*, and screws 17 inserted from the holes 13*a*, 14*a*. However, the side wall member 13 includes a projecting portion 15 provided along a horizontal portion 18*a* of each guide groove 18, and the side wall member 13 is formed higher than the side wall member 14 only for the projecting portion 15.

Here, the guide grooves 18 on both sides are grooves in the shape of C in section and guide the shutter 2 when the shutter 2 is slid from a closing position where the opening 12 is closed to an open position where the opening 12 is open. Also, the guide grooves 18 face each other on the same height, and each guide groove includes a horizontal portion 18*a* extending almost horizontally in a front-rear direction; and a curved portion 18*b* extending downwardly in the shape of C from the terminal end of the horizontal portion 18*a*. At the beginning side of each horizontal portion 18*a* and the terminal side of each curved portion 18*b*, control convexes 18*c*, 18*d* projecting into the groove respectively are provided.

Figure 1:
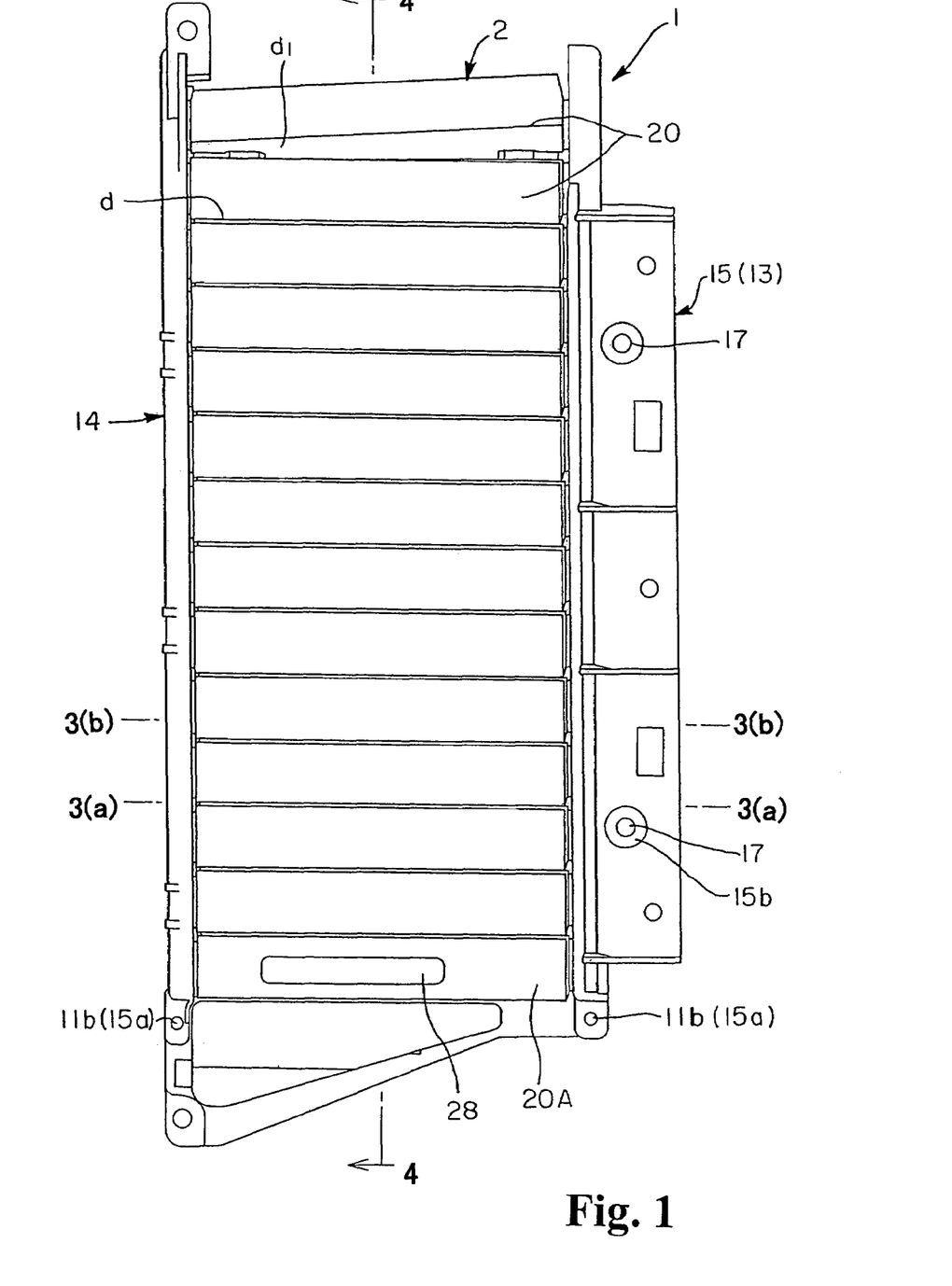
FIG. 1 is a top view showing a device wherein a shutter is applied according to an embodiment of the present invention.
Figure 2:
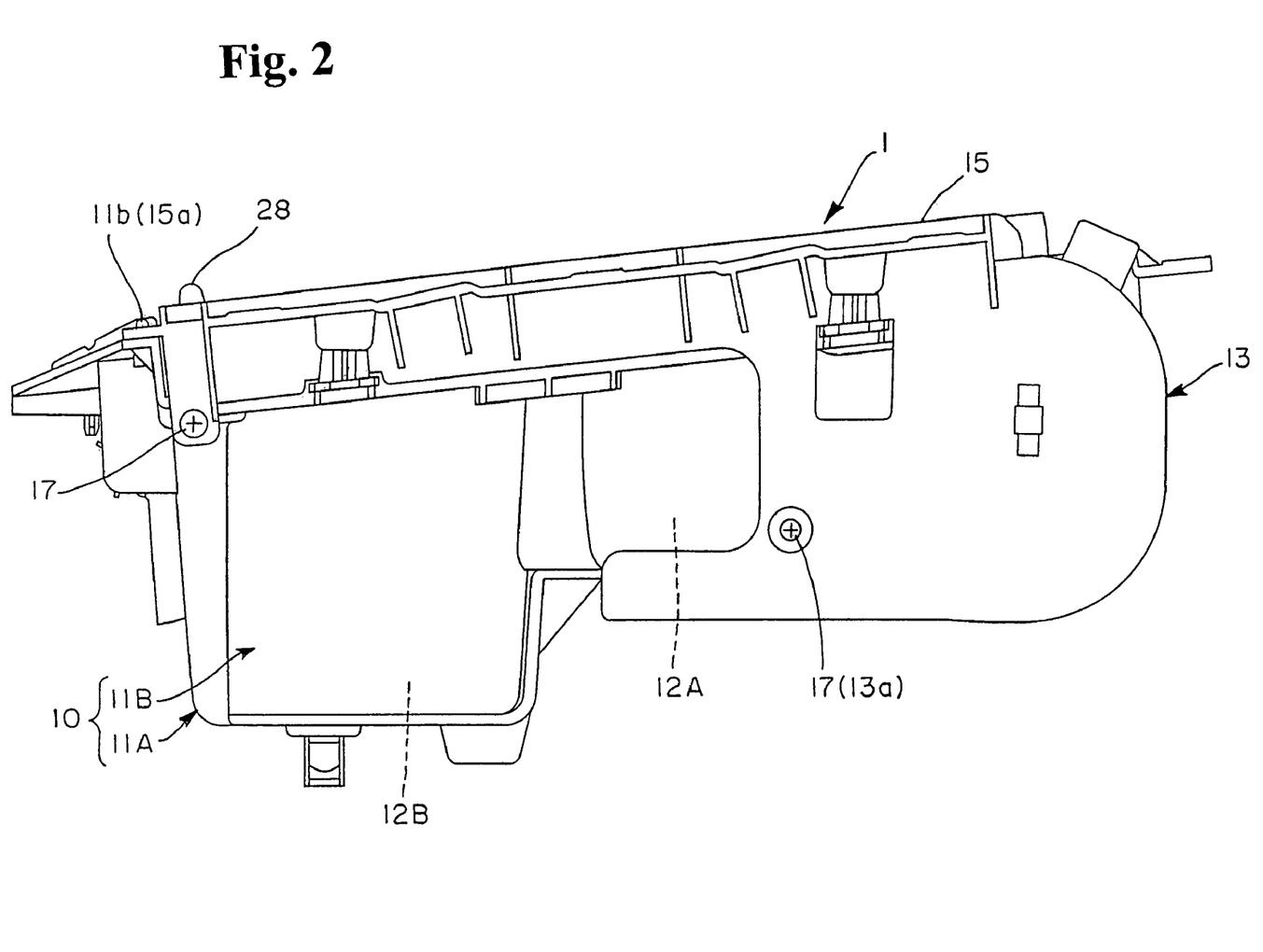
FIG. 2 is a side view seen from the right side of the device in FIG. 1.
Figure 3A:
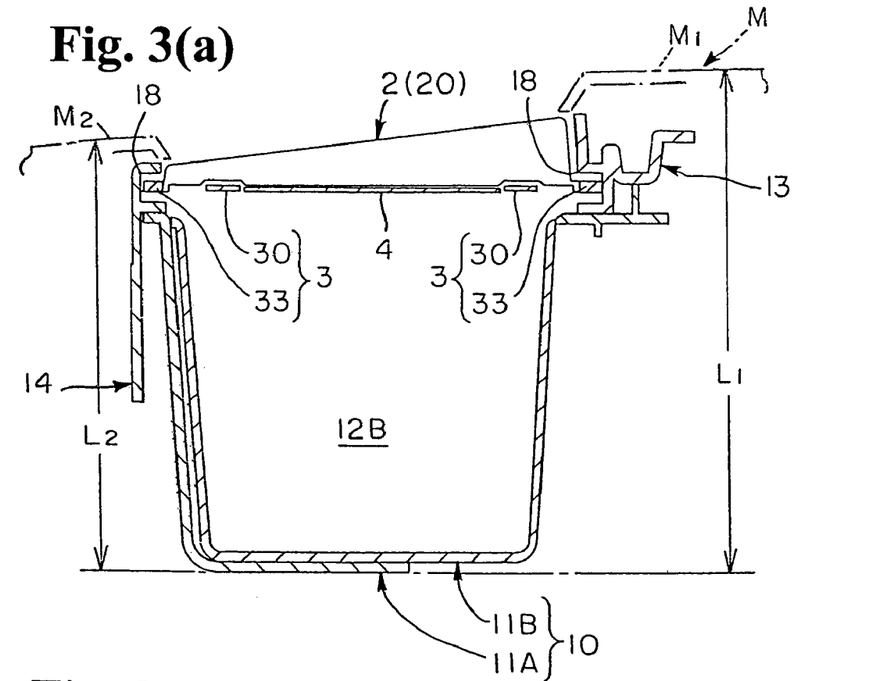
FIG. 3(a) is a sectional view taken along line 3(a)-3(a) in FIG. 1.
Figure 3B:
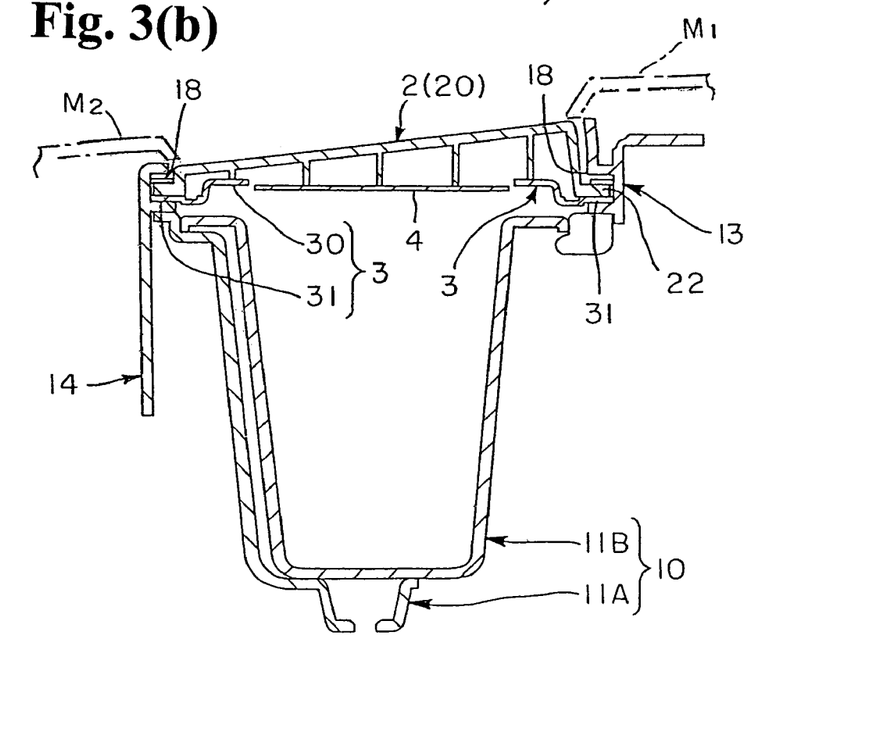
FIG. 3(b) is a sectional view taken along line 3(b)-3(b) in FIG. 1.

On the other hand, as shown in FIGS. 3(*a*), 3(*b*), the projecting portion 15 serves not to form a step in case, for example, an installation surface of the center console M is inclined in the width direction, namely when the housing 10 is disposed in an installation concave, a right console face M1 of the concave (M1 corresponds to one side upper edge in inner side wall portions of the opening of the installation portion) is higher than the left console face M2 (M2 corresponds to the other upper edge in the inner side wall portions of the opening of the installation portion) (i.e., when a distance L1 from an auto body face or horizontal standard face to the console face M1 is higher than a distance L2 from the auto body face or horizontal standard face to the console face M2).

(Shutter Structure) The shutter 2 of the embodiment is composed of a number of rigid pieces 20 disposed alongside the sliding direction for keeping enough distances d, one rigid piece 20A, two connecting members 3 integrating the rigid pieces 20, 20A to be bendable, and a cover member 4 disposed on the back side of the rigid pieces 20, 20A and between the connecting members 3. The rigid pieces 20, 20A, and the connecting members 3 are all resin moldings, and the cover member 4 is made of flexible nonwoven fabric.

Figure 8:
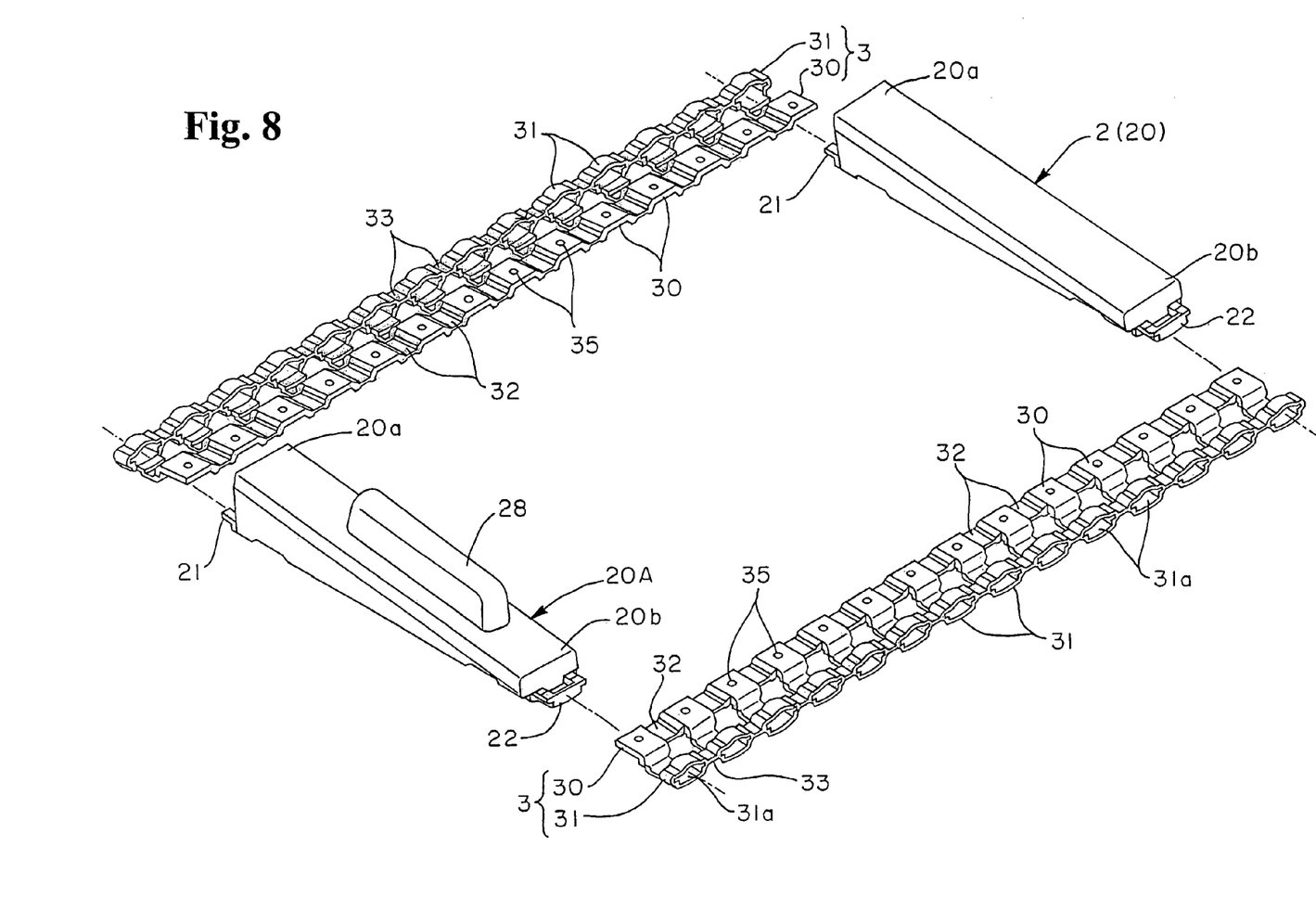
FIG. 8 is an outline structural view showing a relationship between each rigid piece and a connecting member of the shutter.
Figure 9A:
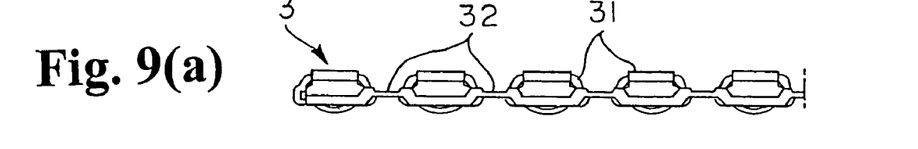
FIGS. 9(a)-9(e) are structural views showing details of the above-mentioned connecting member.
Figure 9B:
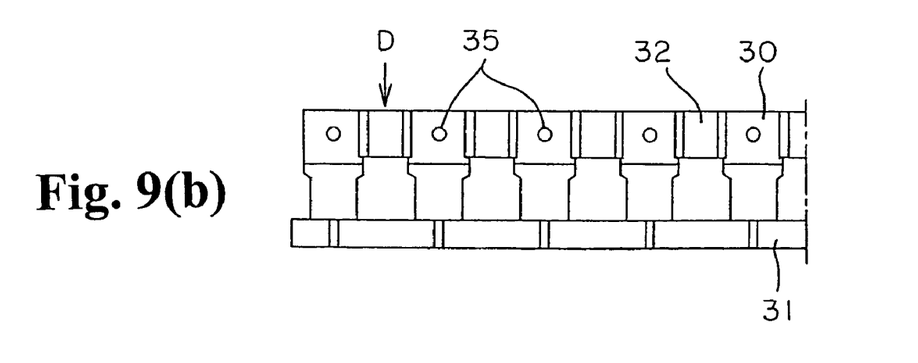
Figure 9C:
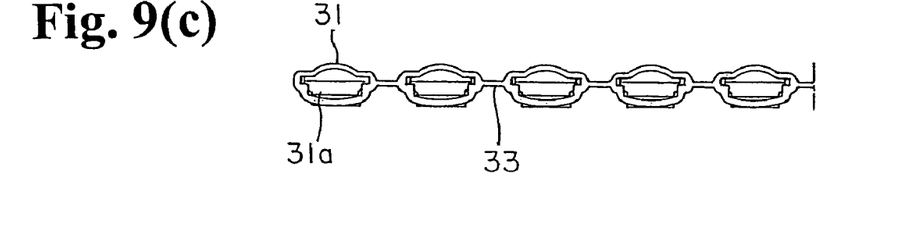
Figure 9D:
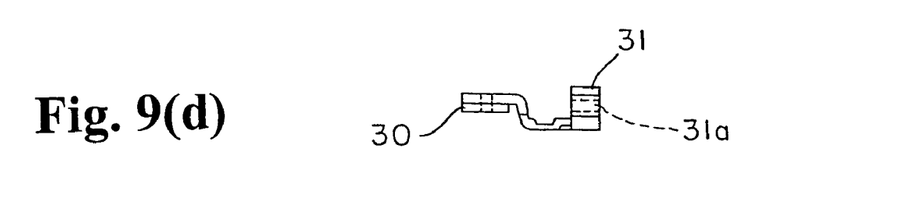
Figure 9E:
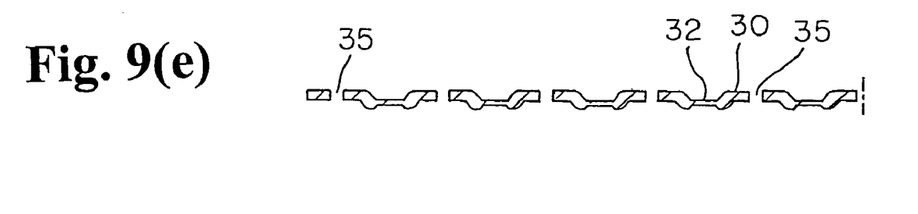
Figure 10A:
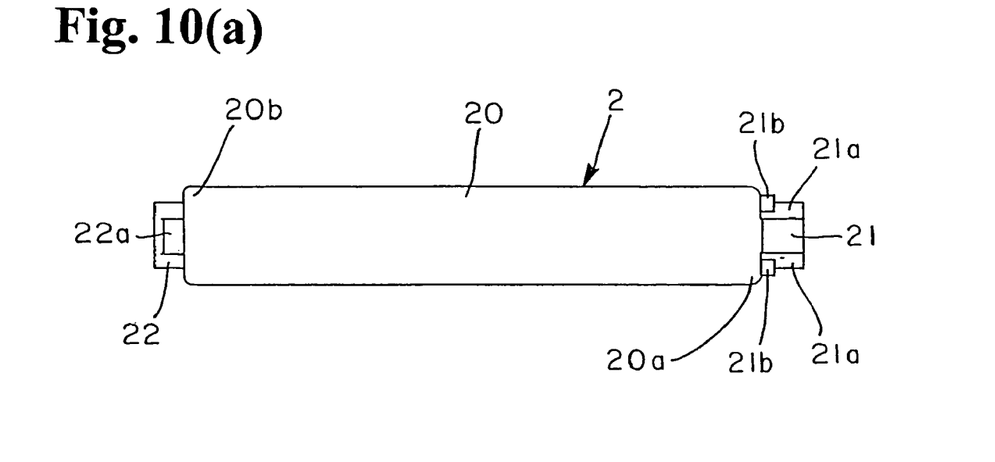
FIGS. 10(a)-10(c) are a top view, side view, and bottom view of each rigid piece (without a handle)
Figure 10B:
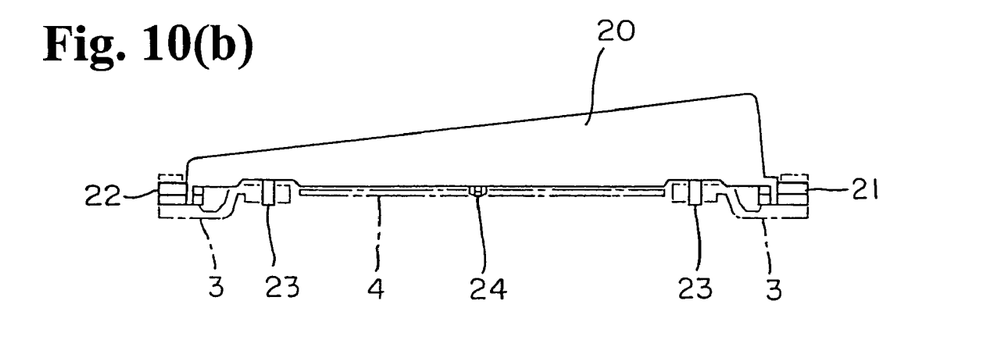
Figure 10C:
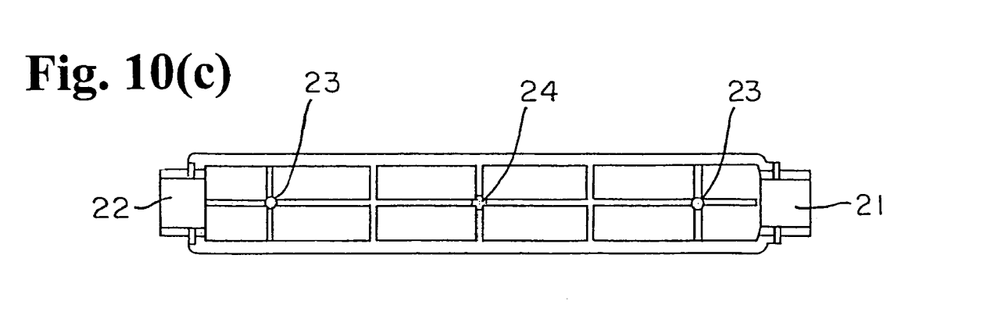

As shown in FIGS. 8, 10(*a*), 10(*b*), 10(*c*), each rigid piece 20 has substantially the same length between both guide grooves 18. Also, each one-end side 20*a* is formed thicker than the other-end side 20*b*. As a result, the outer surface of the design side forms a downward-inclined face toward the other-end side 20*b* from the one-end side 20*a*. On both end faces of the rigid piece 20, the connecting convexes 21, 22 are provided. In each convex 21, upper surfaces are raised with both edges 21*a*, and edge sides 21*b* of both edges 21*a* are additionally raised. The inside of each convex 22 includes a dent 22*a*. On the back side of each rigid piece 20, longitudinal ribs and lateral ribs are disposed in a lattice-like pattern, and portions between each rib are cut out. Also, the back side of each rigid piece 20 includes welding pins 23 provided on the ribs on both sides, and locking pins 24 provided on the ribs substantially between the welding pins 23.

Figure 11A:
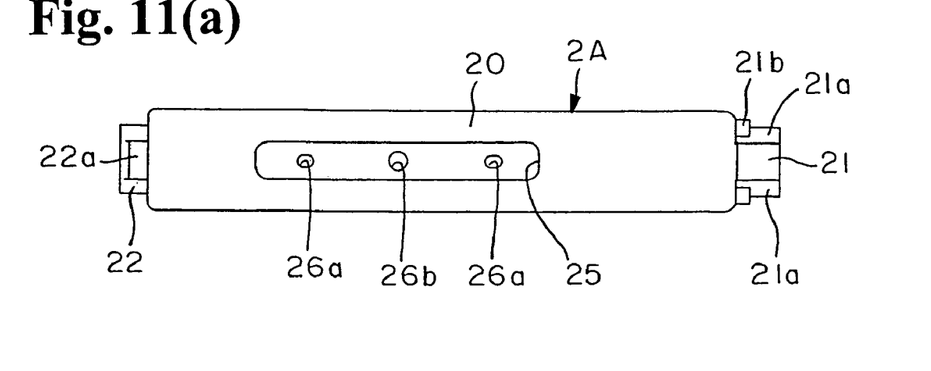
FIGS. 11(a)-11(c) are a top view, side view, and bottom view of the rigid piece (with a handle)
Figure 11B:
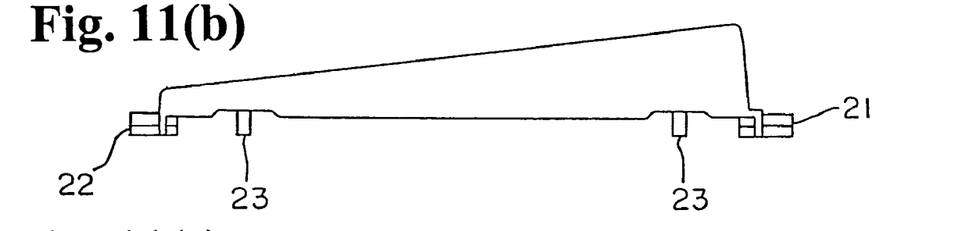
Figure 11C:
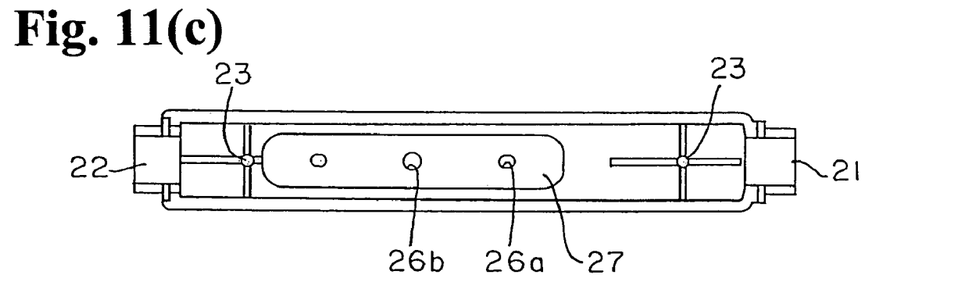

As shown in FIGS. 8, 11(*a*), 11(*b*), 11(*c*), the rigid piece 20A is the same as each rigid piece 20 in the following factors.

Figures 12A, 12B:
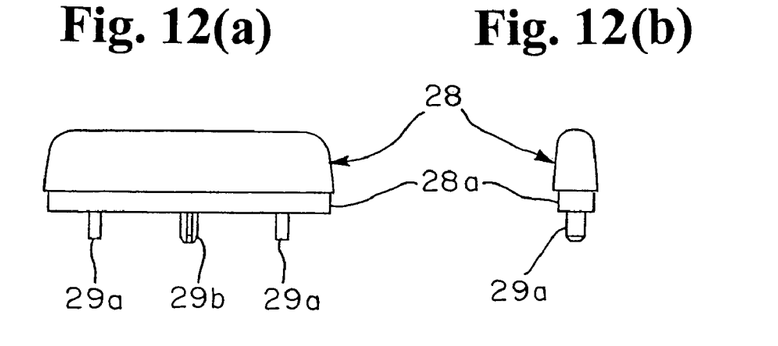
FIGS. 12(a) and 12(b) are a front view and left end view of the handle.

The length of the rigid piece 20A is substantially the same between both guide grooves 18. Each one-end side 20a is formed thicker than each other-end side 20b. The connecting convexes 21, 22 are provided on both end faces. The welding pins 23 are provided on the ribs on both sides of the back face. Also, the rigid piece 20A forms a concave 25 on the outer surface, and a convex 27 at a cut-out place of the back face corresponding to the concave 25. On the convex 27, there are holes 26a on both sides and a hole 26b in the middle, which penetrate up and down. In the concave 25, a handle 28 shown in FIGS. 12(a) and 12(b) is attached.

The handle 28 is provided in a tongue shape on an engagement portion 28a engaging the concave 25. Also, the handle 28 includes welding pins 29a and a press-fit pin 29b projecting from the undersurface of the engagement portion 28a. In the handle 28, the pins 29a are penetrated into the penetrating holes 26a, and the pin 29b is pressed and bonded with the engagement hole 26b, in a state that the engagement portion 28a is engaged with the concave 25. After that, the handle 28 is connected with the rigid piece 20A by welding the tips of the pins 29a projecting on the back side of the rigid piece 20A.

As shown in FIGS. 8, and 9(a)-9(e), the connecting members 3 is integrally formed by piece portions 30 disposed on right and left of the back side of each rigid piece 20, 20A, frame portions 31 formed at the ends of the piece portions 30, thin-walled portions 32 uniting the abutting piece portions 30, and thin-walled portions 33 uniting the abutting frame portions 31 in similar fashion. The piece portions 30 are formed in steps, and provided with an equal number of rigid piece 20, 20A. In the piece portions 30, penetrating holes 35 are provided on one end side which is elevated. Also, the frame portions 31 are provided on the other end side which is lowered. The penetrating holes 35 allow the pins 23 to penetrate from the top to the bottom in a state that the piece portions 30 are disposed on the back side of the rigid pieces 20, 20A.

As shown in FIG. 8, the frame portions 31 form joint holes 31a inserting the convexes 21 or 22 of the rigid pieces 20, 20A. Areas of the thin-walled portions 32, 33 are reduced because the thin-walled portions 32, 33 are provided for keeping predetermined gaps. Accordingly, it is designed that hinge reaction force during bending is reduced. In other words, in the embodiment, in the structure connecting the piece portions by hinges through the thin-walled portions, the thin-walled portions 32, 33 can be invisible while being produced as the shutter. Moreover, since the thin-walled portions 32, 33 are divided through the gaps, the most appropriate operational feeling can be easily created according to the size of the gaps.

Figure 7:
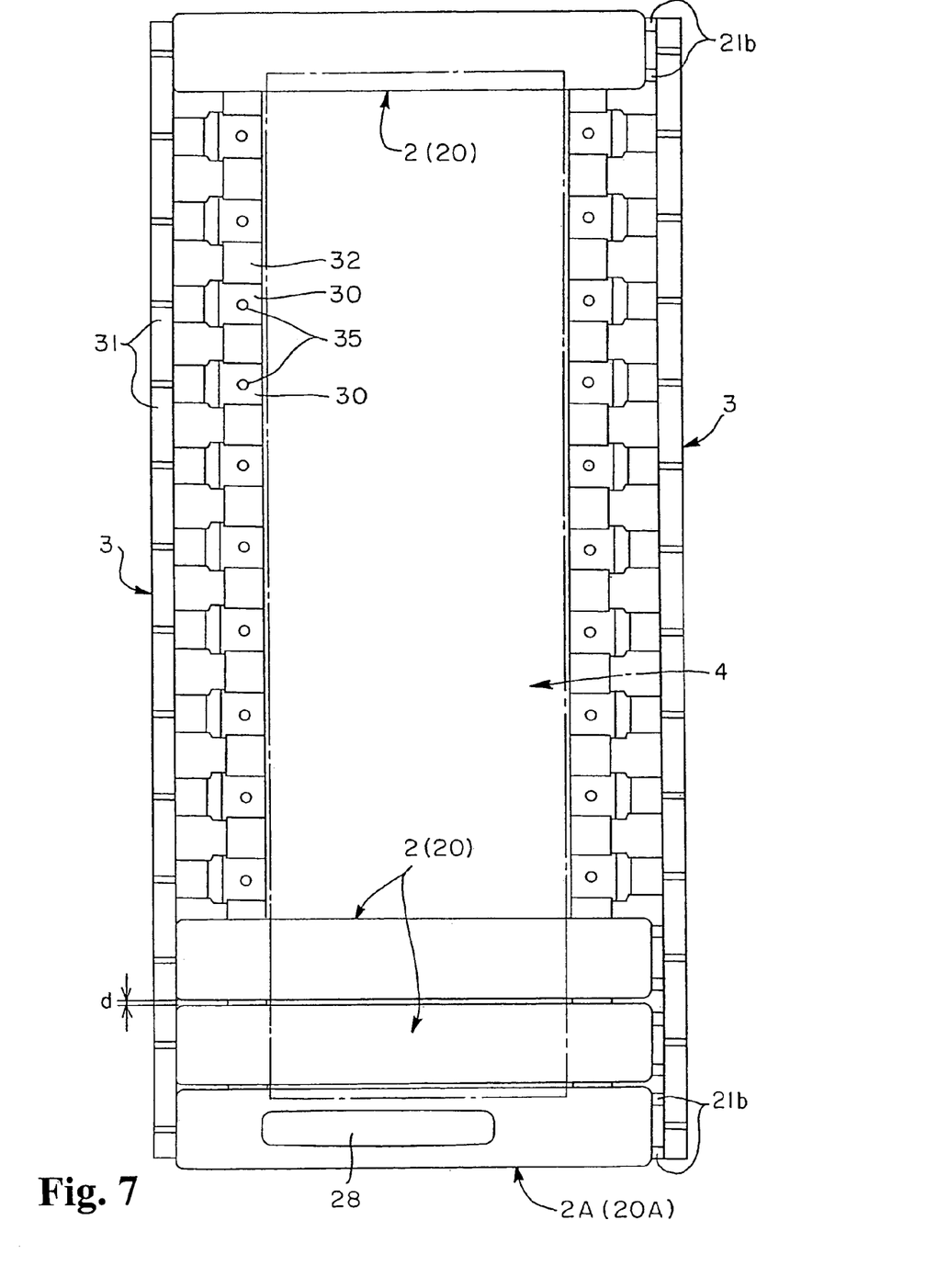
FIG. 7 is a schematic structural view wherein a part of each rigid piece is removed from the above-mentioned shutter.

As shown in FIGS. 3(a), 3(b) and 7, the cover member 4 is in the form of a thin rectangular plate and disposed between the connecting members 3. The cover member 4 includes locking holes not shown in the figures for locking the pins 24 provided on the back side of the rigid pieces 20. Also, since each rigid piece 20, or the rigid pieces 20 and the rigid piece 20A are disposed for keeping the predetermined distances d (for example, 0.5~1 mm), the cover member 4 serves both functions of preventing the possibility of being seen through the distances d of the rigid pieces 20 while being produced as the shutter; and supporting a connecting process of the connecting members 3 when the rigid pieces 20, 20A are united through the belt-like connecting members 3. As the shutter structure, for example, when the distances d are set small, the cover member 4 can be omitted.

(Assembling) The rigid pieces 20, 20A are united to be bendable by the two connecting members 3 and the cover member 4, and produced as the shutter 2. In this assembling operation, as shown in FIGS. 7, 8, for example, it is preferred that the connecting members 3 are disposed in parallel, and the rigid pieces 20, 20A are connected in order from one end of the connecting members 3 to the other end of the connecting members 3. In this case, while the rigid pieces 20, 20A are put on the piece portions 30 on both sides, the pins 23 on the back sides are inserted into corresponding penetrating holes 35 of the piece portions 30. Accordingly, the rigid pieces 20, 20A are positioned. Also, the convexes 21, 22 on both sides are inserted and engaged with corresponding joint holes 31a of each frame portion 31 in order, so that the rigid pieces 20, 20A are attached to the connecting members 3 on both sides. At that point, the convexes 21, 22 are elastically inserted and engaged with the joint holes 31a of the frame portions 31.

The rigid piece 20A and the predetermined number of rigid pieces 20 are attached to both connecting members 3 in order through engagements of the pins 23 and penetrating holes 35, and the convexes 21 or 22 and the frame portions 31. After that, in the state where the back faces of both the rigid pieces 20A, 20 and the connecting members 3 are faced up, the top of each pin 23 projecting on the back face of each piece portion 30 is welded. Herewith, the rigid pieces 20A, 20 are connected to the connecting members 3 on both sides. After that, the pin 24 of each rigid piece 20 is locked in each locking hole not shown in the figures, and then the cover member 4 is attached to the back face of each rigid piece united by the connecting members 3.

(Operation) The shutter 2 is constituted by the frame portions 31 of the piece portions 30 wherein projections fitting into the guide grooves 18 of the device compose the connecting members 3, i.e. the frame portions 31 engaging with the convexes 21 or 22 of the rigid pieces. The shutter 2 is built into a state that the respective frame portions 31 are fitted into the guide grooves 18 of the device on both sides. The shutter 2 is slid from the closing position closing the opening 12 in FIGS. 1, 4 to the open position in FIG. 5 using the handle 28. Also, right before the shutter 2 reaches the open position, the first frame portion 31 from the terminal end elastically climbs over the control convexes 18d of the curve portions 18b composing the guide grooves 18, and then the shutter 2 is locked. Conversely, right before the shutter 2 reaches the closing position, the first frame portion 31 from the front end elastically climbs over the control convexes 18c of the horizontal portions 18a of the guide grooves 18, and then the shutter 2 is locked.

Incidentally, in the above-mentioned shutter structure, in the condition where one side of the upper edges of the side wall members 13, 14 of the opening 12 of the device is formed higher than the other side, the main body of the shutter, i.e. the rigid piece 20A and a number of rigid pieces 20, has the wall thickness in the width direction, and the one-end side 20a is formed thicker than the other-end side 20b corresponding to the upper edge of the side wall members 13, 14. As a result, the line connecting both guide grooves 18 can be maintained substantially in a horizontal position. Consequently, even if the both guide grooves 18 include the curve portions 18b with a small curvature, a sliding characteristic can be maintained.

Also, while the rigid piece 20A and a number of rigid pieces 20 are fitted into the projecting portions corresponding to both guide grooves 18, i.e. the frame portions 31 engaging the convexes 21 or 22, the outer surface of the main body (outer surfaces of the rigid pieces 20, 20A) which is the design side is disposed as a substantially uniform surface with the upper edges of both side wall portions 13, 14 of the opening 2 of the device, or the outer surface of the main body which is the design side is disposed parallel to the line connecting the upper edges M1, M2 of both inner side wall portions of the opening of the installation portion. As a result, the external appearance of the shutter in the closing position can be maintained excellent.

Also, the shutter is constituted by the belt-like elastic connecting members 3 for connecting a number of rigid pieces 20 and the rigid piece 20A, so that while maintaining the overall rigidity, the shutter can be bent with weak stress or reaction force as the hinge reaction force. Accordingly, even if the curvature of the curve portions 18b of the guide grooves is reduced in C or L shape, it is hard to generate excessive local resistance or make an abnormal noise during sliding, so that an excellent sliding characteristic can be maintained. Moreover, the connecting members 3 are positioned on the back faces of the respective rigid pieces 20, 20A through the pins 23, and the convexes 21 or 22 of the rigid pieces are respectively inserted and engaged with the elastic frame portions 31 on the lateral surface. As a result, a number of rigid pieces can be united while maintaining a bending ability and external appearance. Also, since the convexes 21, 22 are fitted into the guide grooves 18 through the frame portions 31, the sliding characteristic can be improved.

In addition, the present invention is not limited to the above-mentioned embodiment. The invention can be variously modified, for example, in the shape of the guide grooves. The invention is limited only by the appended claims.

What is claimed is:

1. A door shutter comprising:
a device including an opening, and side portions for defining the opening having one side and the other side extending higher than the one side,
guide grooves formed along the side portions extending substantially parallel to each other without substantial height difference between the two sides, and having curved portions, and
a shutter including main bodies bendable in a sliding direction for opening and closing the opening on the device, and projecting portions projecting from lateral sides of the main bodies in a width direction thereof and slidably engaging the guide grooves, said main body having a cover member disposed between the guide grooves substantially parallel thereto, a wall thickness in the width direction, and first and second sides corresponding to the one and the other sides of the device, the wall thickness at the second side being thicker than that at the first side corresponding to the other side to form a substantially uniform surface from the one to the other sides through the main bodies inclined relative to the cover member,
wherein said main bodies include elongated rigid pieces arranged along the sliding direction of the shutter with a predetermined space between two rigid pieces and having connecting projections at lateral sides thereof, said rigid pieces being inclined relative to the cover member.

2. A door shutter according to claim 1, wherein said side portions are side walls of a container for forming the device.

3. A door shutter according to claim 1, wherein said device further includes an installation portion having said opening and said side portions.

4. A door shutter according to claim 3, wherein said device further includes a container disposed under the installation portion and having said guide grooves.

5. A door shutter according to claim 1, wherein said opening of the device has a concave forming a holding portion, said curved portion of the guide grooves has a C shape or inverted L along a longitudinal direction of the guide groove, and a line connecting the guide grooves on both sides is substantially horizontal with respect to a bottom face of said concave.

6. A door shutter comprising:
a device having an opening, and side portions for defining the opening,
guide grooves formed along the side portions, and having curved portions, and
a shutter including main bodies bendable in a sliding direction for opening and closing the opening of the device, and projecting portions projecting from lateral sides of the main bodies in a width direction thereof and slidably engaging the guide grooves, said main bodies including elongated rigid pieces arranged along the sliding direction of the shutter with a predetermined space between two rigid pieces and having connecting projections at lateral sides thereof, and rectangular elastic connecting members disposed on back sides of the rigid pieces to enable positioning and having elastic frame portions, said projecting portions being formed by the elastic frame portions where the connecting projections projecting laterally from the rigid pieces are received therein.

7. A door shutter according to claim 6, wherein said connecting members are formed of two members disposed on right and left of the back side of said rigid pieces.

8. A door shutter according to claim 6, wherein each of said connecting members includes piece portions with a number corresponding to that of the rigid pieces, said frame portions respectively provided on said piece portions, and thin-walled portions connecting said piece portions.

9. A door shutter according to claim 8, wherein each of said piece portions has a hole to insert a pin projecting on a back face of said rigid piece, and said thin-walled portion is formed between said piece portions and provided in more than two portions.

10. A door shutter according to claim 1, wherein said main bodies further include rectangular elastic connecting members disposed on back sides of the rigid pieces for connecting the rigid pieces along the sliding direction.

* * * * *